United States Patent [19]
Fatt et al.

[11] 3,769,961
[45] Nov. 6, 1973

[54] CONJUNCTIVAL DEVICE

[76] Inventors: Irving Fatt, 1891 San Antonio Rd., Berkeley, Calif. 94707; Sotiris Kitrilakis, 33 Roble Rd., Berkeley, Calif. 94705

[22] Filed: July 20, 1972

[21] Appl. No.: 273,421

[52] U.S. Cl........... 128/2 T, 128/2.1 E, 128/2.05 T, 128/2 L
[51] Int. Cl............................ A61b 5/02, A61b 3/00
[58] Field of Search ......................... 128/2, 2 E, 2 T, 128/2.1 E, 2.05 T, 2 L

[56] References Cited
UNITED STATES PATENTS

| | | | |
|---|---|---|---|
| 2,836,173 | 5/1958 | Uemura et al. | 128/2 T |
| 3,224,436 | 12/1965 | Massena | 128/2.1 E |
| 3,228,391 | 1/1966 | Fitter et al. | 128/2.05 T |
| 3,335,715 | 8/1967 | Hugenholtz et al. | 128/2 L |
| 3,530,849 | 9/1970 | Watanabe | 128/2 E |
| 3,659,586 | 5/1972 | Johns et al. | 128/2 E |

*Primary Examiner*—Aldrich F. Medbery
*Attorney*—Marcus Lothrop et al.

[57] ABSTRACT

A blood condition indicating and detecting device for use with the palpebral conjunctiva, especially for physiological measurement, includes a locating body having a primary layer with a concave face adapted to abut the sclera and having a convex face adapted to abut the palpebral conjunctiva. The locating body is arranged to be away from the cornea and supports an electrical detecting device having a surface abutting the palpebral conjunctiva. Electrical leads extend from the detecting device through the locating body, emerge near one edge thereof, and are connected to an appropriate indicating device.

11 Claims, 9 Drawing Figures

CONJUNCTIVAL DEVICE

A related arrangement is disclosed in the application of Irving Fatt, one of the present inventors, entitled Non-Invasively Measuring Arterial Oxygen Tension and filed July 20, 1972 with Ser. No. 273,422.

It is highly advantageous for physiological reasons to be able to ascertain many of the characteristics of the blood. This customarily requires an invasive technique and is a relatively cumbersome or long drawn-out affair. It has been observed by one of the inventors (Fatt) and has been reported by him and others in various publications that the palpebral conjunctiva is a unique site in the body whereat the blood vessels approach very closely to the surface. The vessels of the palpebral conjunctiva are so close to the conjunctival epithelium that they are clearly visible. The mucous membrane epithelium overlying these vessels is only two to four cell layers thick, and appears to have a very low oxygen consumption rate. It is therefore possible, by locating a probe against the palperbral conjunctiva to get an accurate and well-coordinated indication of a blood characteristic and to display such indication in immediately readable form. For example, blood oxygen tension can be detected, monitored and indicated in this fashion. While hand-holding of a probe or detector has been employed, and while scleral lenses have been used as supports for palpebral conjunctive detectors, there still are substantial drawbacks to the arrangement. See, for example, M. Kwan and I. Fatt, "A Noninvasive Method of Continuous Arterial Oxygen Tension Estimation from Measured Palpebral Conjunctival Oxygen Tension," Anesthesiology 35, 309–314 (1971). It is highly advisable to have a means for holding the detector in as comfortable a position as possible for a protracted period, perhaps days, without deleterious results.

It is therefore an object of the invention to provide a device for use with the palpebral conjunctiva which can be tolerated by a patient for a protracted period without trauma.

Another object of the invention is to provide such a device which is well and accurately held in position.

A further object of the invention is to provide such a device that can maintain a detector in an optimum position relative to the palpebral conjunctiva yet away from adjacent sensitive areas.

Another object of the invention is to provide an effective mounting for a palpebral conjunctiva detector.

A still further object of the invention is to provide in a palpebral conjunctiva device a way to position a sensor relative to the adjacent anatomy.

A still further object of the invention is to provide a palpebral conjunctiva device that can be maintained in sterile condition, can be readily applied and removed, and has an effective, long life.

Another object of the invention is to provide a means for measuring one or more factors of the blood singly or together, such as the tension of oxygen, of carbon dioxide, the pH value, temperature and the like.

Other objects, together with the foregoing, are attained in the embodiment of the invention described in the accompanying description and illustrated in the accompanying drawings, in which.

Figure 1:
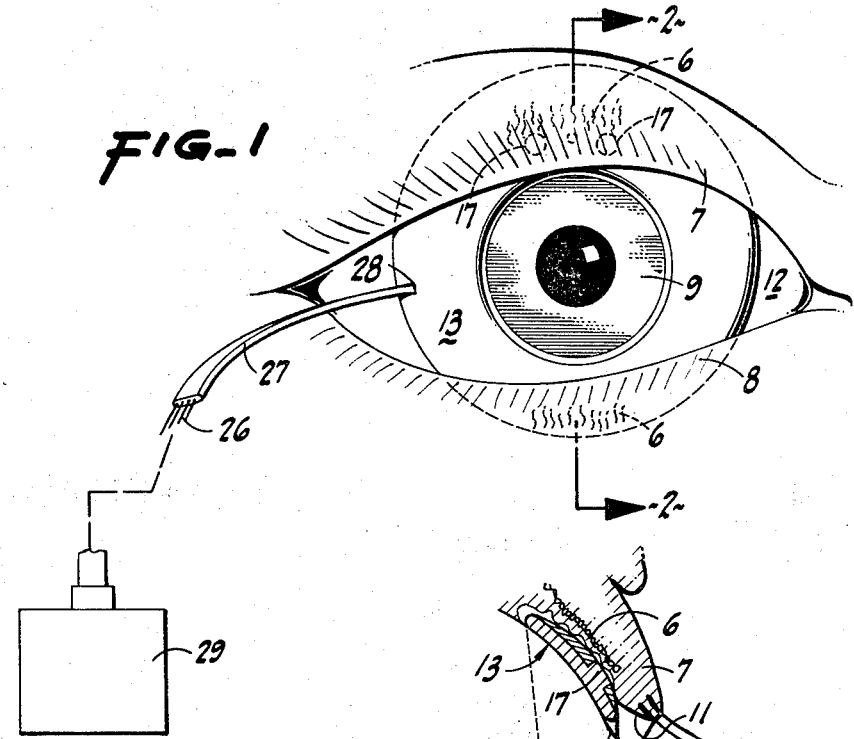
FIG. 1 is an illustration of a human eye with the palpebral conjunctiva device in association therewith, portions of the figure being broken away.
Figure 2:
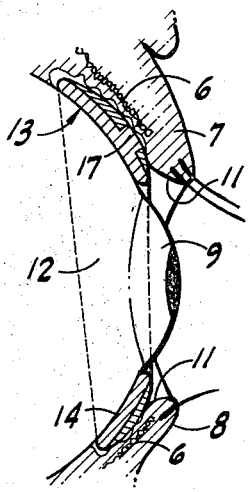
FIG. 2 is a cross-section on the line 2—2 of FIG. 1.
Figure 4:
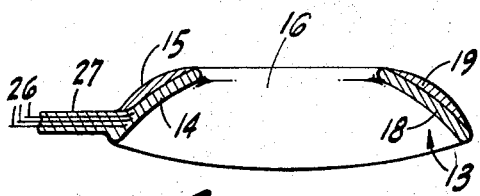
FIG. 4 is a cross-section on the line 4—4 of FIG. 3.

While previous work concerning conjunctival devices has been done with various experimental animals as well as humans, it is convenient to refer herein to human use alone, although adaptation of the device and technique to other environments is readily accomplished. The palpebral conjunctiva appears in many animals as a bed 6 or zone on the interior of the upper eyelid 7, and to a somewhat lesser extent on the interior of the lower eyelid 8. The principal concentration of the capillaries in the zone or bed 6 is symmetrically disposed with respect to and just above the cornea 9. This capillary bed is for the purpose of supplying oxygen to the cornea when atmospheric air is not available thereto, as when the eyelid is closed. The thickness of a membrane 11 disposed between the palpebral conjunctiva and the cornea is only a very few cells so that oxygen transmission from the palpebral conjunctiva to the cornea is highly efficient, only a small amount of oxygen being extracted by the intervening membrane cells.

Pursuant to the invention, we preferably provide for introduction between the eyelid 7 and the sclera 12 a body 13 having a concave interior surface 14 and a convex exterior surface 15. The body is composed of any of various materials which are compatible with and are not detrimental to the surroundings. Materials which have been utilized in connection with scleral lenses are appropriate. The body 13 preferably has a contour or shape making it fit quite closely to the subjacent sclera as well as to the superposed eyelid. The area and extent of the body may vary substantially. The body may be configured to extend over the cornea 9 and may, in fact, have a lens characteristic. It is greatly preferred that the body occupy relatively small areas adjacent to the cornea and that it not extend over the cornea. For that reason the body is formed with a central opening 16. This is largely because it is desired to disturb the normal environment just as little as possible, particularly when long-term patient monitoring is required. While the drawings show the body 13 of substantially annular aspect in elevation, it is not necessary that the body be as extensive. The body is preferably only extensive enough accurately to stay in position or to hold a predetermined location.

Figure 3:
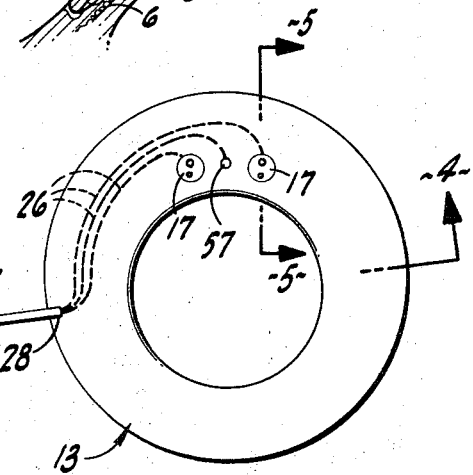
FIG. 3 is a reverse or rear elevation view of the structure of FIG. 1, portions being broken away.
Figure 5:
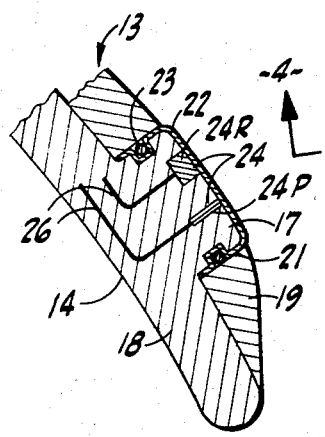
FIG. 5 is a cross-sectional view through a portion of the device showing one form of detector.

Particularly, as shown in FIGS. 3 and 5, we provide a detector 17 on the body 13. The detector conveniently is positioned and retained by a special construction of the body. In this instance, the body 13 is inclusive of an inner layer 18 and an outer layer 19 designed to fit quite closely together. Conveniently, the detector 17 is fitted on the inner layer 18 in a position so that it is in immediate abutment with the central portion of the palpebral conjunctiva zone 6 when the eyelid 7 is open, and still is in contact with a substantial portion of the zone 6 when the eyelid is closed. To assist in holding the detector 17 in place and to afford a suitable surface for abutment with the palpebral conjunctiva, the detector projects through an opening 21 in the outer layer 19. The projection, however, is only to form a substantial continuation of the configuration of the outer surface of the layer 19. A permeable membrane 22 extends over the detector 17 and is suitably retained and anchored in the detector 17, sometimes by a securing ring 23.

The detector 17 houses one or more electrodes or electrode combinations, generally designated 24. These have very small leads, such as 26, encased in appropriate, representative insulation 27. Together they are formed as a very thin, narrow ribbon of considerable flexibility. The ribbon or lead group preferably extends from the detector 17 through the body 13 and emerges therefrom at a predetermined point 28 close to either of the junctions of the upper eyelid and the lower eyelid, or in any position with a small amount of adjacent relative movement. The conductors lead away from the vicinity of the eye and extend to an appropriate monitor 29 of any convenient character to afford an appropriate read-out of the transmitted response.

Figure 6:
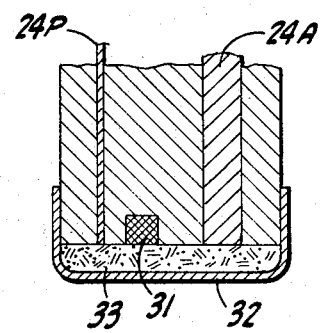
FIG. 6 is a cross-sectional view showing a different form of detector.

As shown particularly in FIG. 5, the detector 17 is designed especially to detect oxygen. The detector 17 or sensor includes a platinum electrode 24P having an end face substantially flush with the face of the detector and also includes a reference electrode 24R similarly positioned and contoured. It is also particularly desired to detect the tension of $CO_2$ in the blood and further to measure blood pH and blood temperature. Various detectors may be furnished for these purposes singly or conjointly. In FIG. 6 is shown a similarly mounted and connected redox detector for detecting carbon dioxide and including a bright platinum electrode 24P and a silver and silver chloride reference electrode 24A. Between the electrodes is a reservoir 31 containing an electrolyte saturated with a redox chemical such as quinhydrone or 2,6 dichlorophenolindophenol. Between the end of the detector proper and an overlying hydrogel membrane 32 permeable to $CO_2$ is a fibrous matrix 33 open to the reservoir 31 and providing complete electrolyte availability and coverage.

Figure 7:
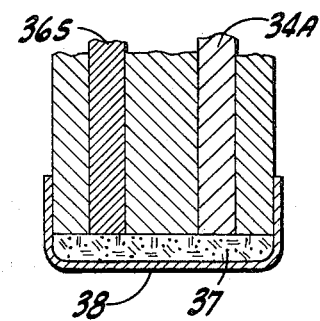
FIG. 7 is a view similar to FIG. 6 and showing a further modified form of detector.

As a variation, there is shown in FIG. 7 a detector having a silver-silver chloride reference electrode 34A as well as an antimony electrode 36S. These are covered with a matrix 37 saturated with an electrolyte, as mentioned, and in turn covered by a $CO_2$ permeable membrane 38.

Figure 8:
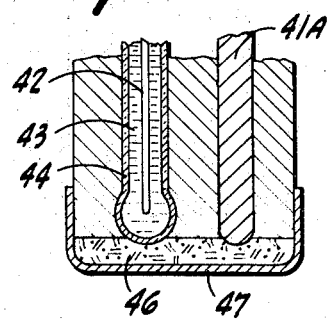
FIG. 8 is similar to FIG. 6 and shows another form of detector.

A so-called glass electrode in the Severinghaus sensor arrangement may also be used, as shown in FIG. 8. The detector has a silver-silver chloride reference electrode 41A and a metal lead 42 bathed in an electrolyte 43 encased in a glass envelope 44. The customary electrolyte soaked matrix 46 covers both electrodes and is held in position by a $CO_2$ permeable membrane 47.

Figure 9:
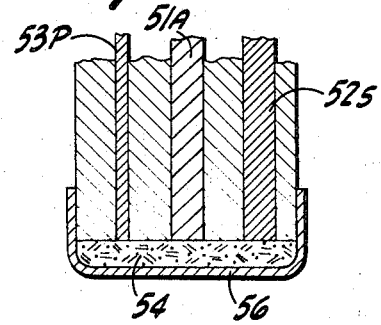
FIG. 9 is similar to FIG. 6 and shows a further form of detector.

It is possible to detect oxygen alone, carbon dioxide alone or both together. For the latter purposes a detector as shown in FIG. 9 may be employed. Therein a silver-slver chloride reference electrode 51A is disposed adjacent an antimony electrode 52S and adjacent a platinum electrode 53P. All of the flush electrode ends are covered by a matrix 54 saturated with an electrolyte and covered by a membrane 56 permeable to $CO_2$ and $O_2$. This electrode combination permits the simultaneous detection of the tension of $O_2$ and the tension of $CO_2$.

There are many other variations in electrode make up and configuration all capable of being incorporated in a detector. For example, it is sometimes desired to compensate for the different temperature sensitivity of the electrodes, the sensitivity of the redox electrodes being twice that of the glass electrode. In that case, a thermistor 57 (FIG. 3) is provided in the body 13 and is appropriately connected.

What is claimed is:

1. A blood condition detecting device for use with the palpebral conjunctiva comprising a primary layer having a concave face with the contour shaped to at least a portion of the sclera surrounding the cornea, an electrical detecting device mounted in said primary layer and having a measuring face substantially spaced from said concave face, and a secondary layer overlying said primary layer and having a convex face with the contour shaped to of at least a portion of the palpebral conjunctiva and substantially continuing said measuring face.

2. A device as in claim 1 including leads joined to said detecting device and extending through and from said primary layer.

3. A device as in claim 1 including a membrane overlying said detecting device and extending between said detecting device and said secondary layer.

4. A device as in claim 1 in which said primary and secondary layers are provided with an opening in the vicinity of the cornea.

5. A device as in claim 1 in which said detecting device includes a portion outstanding from said primary layer and encasing electrodes extending substantially to said measuring face.

6. A blood condition detecting device for use with the palpebral conjunctiva comprising a body having an inside surface shaped to fit against the sclera and having an outside surface shaped to fit against the palpebral conjunctiva, means on said body defining an opening therein adjacent to but clear of the cornea, an electrical detecting device on said body having a face, said detecting device face in position to contact said palpebral conjunctiva, leads extending from said detecting device, and indicating means remote from said body connected to said leads.

7. A blood condition detecting device for use with the palpebral conjunctiva comprising a body adapted to fit between the sclera and said palpebral conjunctiva, an electrical detector mounted on said body adapted to contact with said palpebral conjunctiva, said detector having means for affording a response to arterial $CO_2$ tension in said palpebral conjunctiva, and means for displaying said response.

8. A blood condition detecting device for use with the palpebral conjunctiva comprising a body adapted to fit between the sclera and the palpebral conjunctiva, an electrical detector mounted on said body adapted to contact with said palpebral conjunctiva, said detector having means for affording a response to arterial pH in said palpebral conjunctiva, and means for displaying said response.

9. A blood condition detecting device for use with the palpebral conjunctiva comprising a body adapted to fit between the sclera and said palpebral conjunctiva, an electrical detector mounted on said body adapted to contact with said palpebral conjunctiva, said detector having means for affording a response to arterial temperature in said palpebral conjunctiva, and means for displaying said response.

10. A blood condition detecting device for use with the palpebral conjunctiva comprising a body adapted to fit between the sclera and said palpebral conjunctiva, electrical detecting means mounted on said body adapted to contact with said palpebral conjunctiva for simultaneously affording responses to two or more conditions of the palpebral conjunctiva including the arterial oxygen tension, the arterial $CO_2$ tension, the arterial pH and the arterial temperature, and means for displaying said responses.

11. A device as in claim 10 in which said means includes one detector responsive to two or more of said conditions.

* * * * *